Patented Oct. 31, 1939

2,177,668

UNITED STATES PATENT OFFICE 2,177,668

PROCESS OF AGING CALCINED GYPSUM

Frank L. Marsh and Dudley C. Chads, Medicine Lodge, Kans., assignors, by mesne assignments, to National Gypsum Company, Buffalo, N. Y., a corporation of Delaware No Drawing. Application March 18, 1937, Serial No. 131,673

11 Claims. (Cl. 106—34)

This invention relates to a process for aging calcined gypsum, sometimes hereinafter referred to as gypsum plaster or plaster, and more particularly to a process of producing artificially and in a very short time relative to ordinary methods pure, uniform and strong calcined gypsum products having the characteristics of those which have been aged for several months under natural conditions.

It is known that freshly calcined gypsum chemically combines with approximately from fifteen to twenty-five percent of water by weight of the gypsum plaster and that additional water is added to the gypsum plaster to render it workable for commercial purposes.

It is also known that the chemical combination of water with calcined gypsum over long periods of time, for example, by absorption of moisture vapor from the air, which is known to the trade as "aging", reduces the amount of water required, when subsequently added, to render the gypsum plaster workable and that, consequently, less water need be evaporated from the set gypsum products when in finished and commercially applied condition, which results in a stronger product than if the gypsum plaster were used without aging.

Storage of calcined gypsum to effect the desired absorption thereby of moisture vapor from the air is not practical for the reason that a successful product is dependent upon weather and storage conditions and, further, requires a substantial outlay of capital without a prompt or adequate resulting income.

The addition, during calcination or otherwise, of ingredients to the gypsum plaster for accelerating absorption thereby of moisture from the air is also undesirable for the reason that an impure calcined gypsum product results from this practice.

It is, therefore, the principal object of the present invention to provide a process for rapidly and artificially aging calcined gypsum, without the addition thereto of foreign ingredients, in such a manner that the plaster after being treated by this process will have all of the characteristics, both chemical and physical, of a plaster that has been aged for several months under natural conditions that are conducive to the aging of plaster.

It is also an object of the invention to provide a process whereby these desired characteristics may be imparted to the plaster much more rapidly than by methods heretofore available for this purpose.

In accomplishing these objects by the practice of our method, we have found, generally, that calcined gypsum when subjected to a moisture carrying gaseous agent under predetermined operating conditions produces the desired product.

We have further found, more particularly, that the proper correlation of operating factors, such as the manner of exposure of the calcined gypsum to a humidified gas predetermined for producing the desired reaction under suitable temperature conditions for a definite length of time, results in an artificially aged product which appears to have been aged for several months under natural conditions.

For example, instead of relying on uncertain weather and storage conditions to effect the chemical combination of water with the calcined gypsum to produce the desired product by absorption of water vapor from the air, which, under the most favorable conditions, requires several months, we mechanically introduce available moisture to the calcined gypsum, under definite conditions correlated from the factors effecting the reaction, to produce the desired result.

In order to effect the application of the water to the gypsum plaster, the water may be applied in the form of vapor carried by a suitable gas to which the gypsum plaster is exposed. The amount of water carried by the gas may be varied depending upon the temperature of the gas, the exposure of the plaster to the gas, the time of the reaction, and the condition of the plaster as determined by its original calcination.

During the practice of the process the gypsum plaster is agitated in such a manner that it is exposed to the gas carrying the available moisture, and the moisture is taken up by the plaster and chemically combined with each particle of plaster, thereby quenching the thirst of the plaster and satisfying the requirements of the plaster for the chemical rehydration to produce the desired physical and chemical characteristics of an aged plaster.

The temperature at which the gas is maintained during the treatment of exposure of the plaster and application of moisture thereto, is also predetermined, as distinguished from the normally indeterminate weather conditions which ordinarily obtain, but the temperature of the plaster during treatment incidentally varies due to the chemical reaction which takes place during the process. This is also dependent upon the quality, quantity and original temperature of plaster being treated, and also the rate of exposure.

For example, under one correlation of conditions, the temperature of the gas may be maintained at 105° F.; the plaster exposed in a mixer with fairly rapid agitation; the original temperature of the plaster subjected to treatment being 54° F. and under such conditions the temperature of the plaster and water of crystallization (which is determined by the ignition loss) at intervals is shown on the table below:

|  | Degrees Fahrenheit | Percent ignition loss |
| --- | --- | --- |
| Initial temperature | 54 | 2.05 |
| 5 minutes treatment | 136 | 3.75 |
| 10 minutes treatment | 152 | 4.72 |
| 15 minutes treatment | 145 | 5.34 |
| 20 minutes treatment | 129 | 5.63 |
| 25 minutes treatment | 125 | 5.68 |
| 30 minutes treatment | 114 | 5.80 |
| 45 minutes treatment | 108 | 6.03 |
| 60 minutes treatment | 107 | 6.22 |

With the initial temperature of the plaster at 165° F. as contrasted with 54° F. original temperature shown above, the temperature of the plaster at intervals is shown in the following table:

| | Degrees Fahrenheit |
| --- | --- |
| Initial temperature | 165 |
| 5 minutes treatment | 150 |
| 10 minutes treatment | 154 |
| 15 minutes treatment | 155 |
| 20 minutes treatment | 155 |
| 25 minutes treatment | 145 |
| 30 minutes treatment | 137 |
| 45 minutes treatment | 121 |
| 60 minutes treatment | 113 |
| 75 minutes treatment | 109 |

The predetermined time set for the reaction is dependent upon the initial temperature of the gypsum plaster that is to be treated, the temperature of the gas carrying the moisture, the humidity of the gas, the rate of exposure and the characteristics of the plaster to be treated. We have shown in the above tables a processing reaction that required 1 hour and 15 minutes to produce an aged plaster under one set of conditions, and another processing reaction that required 1 hour to produce an aged plaster under another set of conditions. We can by properly controlling the other factors, greatly lessen the time factor.

We have further found that variation within very broad limits of one or more of the factors mentioned may be compensated for by a correlated variation in one or more of the other factors mentioned, our process still producing the desired products.

Since the process may be carried out under a number of sets of conditions with various types of equipment we, therefore, do not wish to be limited to a specific set of conditions or type of equipment for the operation of our process.

As an example, for the purpose of illustration only, of one manner in which we carry out our process, freshly burned gypsum, plaster of Paris, for example, is ground and suitably placed in exposure equipment of any desired type, for example, a mixer. The mixer is then rotated at a rate of substantially one revolution per second to agitate the plaster for exposing each particle of the gypsum plaster to a moisture carrying gaseous agent, for example air, which is applied to the gypsum plaster, in any suitable manner. The gaseous agent should contain an amount of moisture capable of being chemically combined with the gypsum plaster and under an approximately sixty percent relative-humidity condition. The temperature condition is approximately 100° F., and maintained in any suitable manner. We have found that approximately one hour is satisfactory for the duration of the treatment of gypsum plaster, in accordance with this example, to produce a product appearing to have been aged for several months under natural conditions.

The principal advantages of our process over other processes for the same purpose heretofore available are that the aging of calcined gypsum products is not left to mere conjecture as in the aging of such materials under natural conditions, but, on the contrary, predetermined factors are employed whereby accurate and sure results are obtained in a very short time, thereby saving labor, time and storage costs, and, further, the moisture combined with the calcined gypsum through the use of our process results in pure and uniform finished products as distinguished from the adulteration of the material by addition thereto of deliquescent salts or other ingredients, which also results in saving the cost of such other ingredients as well as adding to the strength and purity of the finished products.

What we claim and desire to secure by Letters Patent is:

1. The process of aging calcined gypsum including agitating the gypsum, exposing the gypsum to a moisture carrying gaseous agent having a predetermined relative-humidity, and continuing the agitation and exposure until rehydration of the gypsum by the moisture content of the gaseous agent to the hemihydrate is effected.

2. The process of aging calcined gypsum including grinding freshly burned plaster of Paris, agitating the plaster in a suitable agitator by rotating the agitator at a rate of approximately one revolution per second, exposing the plaster to air having an approximately sixty percent relative-humidity, maintaining the air at a temperature of approximately 100° F., and continuing the agitation and exposure of the plaster for approximately one hour.

3. The process of aging calcined gypsum including confining the gypsum and exposing particles of the gypsum, while confined, to artificial conditions of temperature, rate of exposure, and relative humidity for a definite time period, the relative humidity being sufficiently low to avoid condensation on the gypsum particles but sufficiently high to rehydrate the calcined gypsum to the hemihydrate.

4. The process of aging calcined gypsum including confining the gypsum and exposing particles of the gypsum, while confined, to artificial conditions of temperature, rate of exposure and relative humidity for a definite time period, the temperature being sufficiently low to permit rehydration of the gypsum to the hemihydrate.

5. The process of aging calcined gypsum including confining the gypsum, and exposing particles of the gypsum, while confined, to artificial conditions of temperature, rate of exposure and relative humidity for a definite time period, the relative humidity being sufficiently low to avoid condensation on the gypsum particles, and the temperature sufficiently low to permit rehydration of the gypsum to the hemihydrate.

6. The process of aging calcined gypsum including confining the gypsum, and exposing particles of the gypsum, while confined, to artificial conditions of temperature, rate of exposure and relative humidity for a definite time period, the relative humidity being approximately sixty per cent, and the temperature sufficiently low to permit rehydration of the gypsum to the hemihydrate.

7. The process of aging calcined gypsum including confining the gypsum, and exposing particles of the gypsum, while confined, to artificial conditions of temperature, rate of exposure and relative humidity for a definite time period, the relative humidity being sufficiently low to avoid condensation on the gypsum particles, and the temperature being approximately from 100° F. to 110° F. to permit rehydration of the gypsum to the hemihydrate.

8. The process of aging calcined gypsum including confining the gypsum, and exposing particles of the gypsum, while confined, to artificial conditions of temperature, rate of exposure and relative humidity for a definite time period, the relative humidity being approximately sixty per cent to avoid condensation on the gypsum particles, and the temperature being approximately from 100° F. to 110° F. to permit rehydration of the gypsum to the hemihydrate.

9. The process of aging calcined gypsum including reacting the gypsum, while confined, and in agitation, under a predetermined controlled temperature condition, for a definite time period, with a gas having a relative humidity sufficient to rehydrate the gypsum to the hemihydrate but insufficient to rehydrate the gypsum to the dihydrate.

10. The process of aging calcined gypsum including reacting the gypsum, while confined, and in agitation, under a predetermined controlled temperature condition of approximately 110° F., for a time period of approximately one hour, with air having a relative humidity of approximately sixty per cent, whereby the gypsum is rehydrated to the hemihydrate but not to the dihydrate.

11. The process of aging calcined gypsum including reacting the gypsum, while confined, and in agitation, under a predetermined controlled temperature condition of approximately 110° F., for a time period of approximately one hour, with air having a relative humidity of approximately sixty per cent whereby the gypsum is rehydrated to the hemihydrate but not to the dihydrate, the agitation being sufficient to expose the gypsum particles to the air approximately once per second for the duration of the time period.

FRANK L. MARSH.
DUDLEY C. CHADS.